United States Patent

Hubert

[15] 3,635,037

[45] Jan. 18, 1972

[54] PELTIER-EFFECT HEAT PUMP

[72] Inventor: Helmut Hubert, Erda, Germany

[73] Assignee: Buderus'sche Eisenwerke, Wetzlar, Germany

[22] Filed: Aug. 31, 1970

[21] Appl. No.: 68,189

[30] Foreign Application Priority Data

Sept. 2, 1969 Germany ..................... P 19 44 453.2

[52] U.S. Cl. .................................................62/3, 136/204

[51] Int. Cl. .......................................................F25b 21/02

[58] Field of Search ................................62/3; 136/203, 204

[56] References Cited

UNITED STATES PATENTS

| | | | |
|---|---|---|---|
| 3,006,979 | 10/1961 | Rich | 62/3 |
| 3,196,620 | 7/1965 | Elfring | 62/3 |

*Primary Examiner*—William J. Wye
*Attorney*—Karl F. Ross

[57] ABSTRACT

A Peltier-effect pile is mounted in a heat exchanger or heat sink with semiconductive barrier layers insulating the Peltier electrodes from the metal of the heat sink. The semiconductive layers are poled electrically or biased to minimize electrical conductivity thereacross but permit maximum heat flow between the Peltier pile and the heat exchange jacket.

6 Claims, 1 Drawing Figure

PATENTED JAN 18 1972
3,635,037
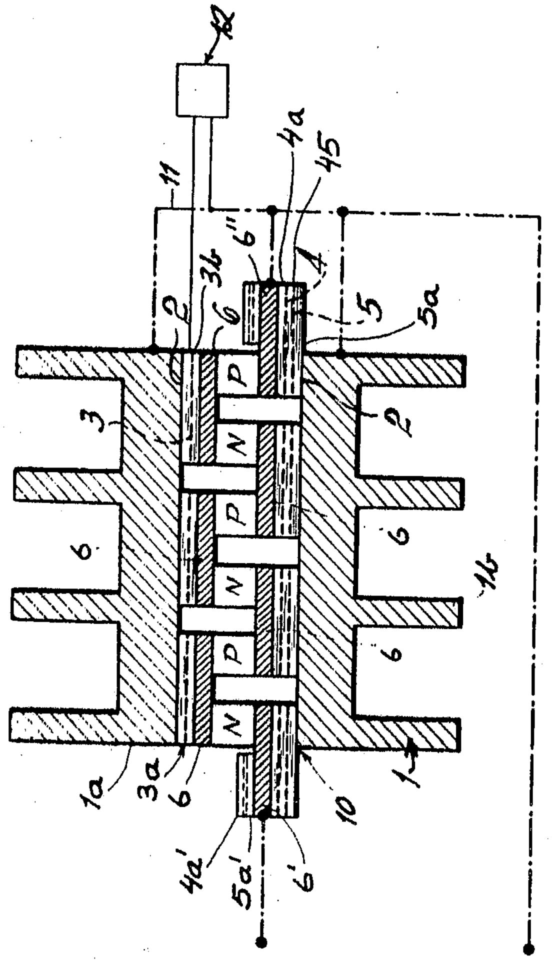
INVENTOR:
Helmut Hubert
BY
Karl G. Ross
Attorney

PELTIER-EFFECT HEAT PUMP

The Peltier-effect has been used heretofore in heat pumps for the heating or cooling of areas and substances in which fluid-refrigeration cycles are disadvantageous. For example, for small lightweight refrigerators, compressors, evaporators and associated components of a vapor/liquid refrigerating cycle may be inconvenient and it has, therefore, been proposed to use the heat pump action of a Peltier pile. The Peltier effect may be described as a thermoelectric phenomenon whereby heat is generated or abstracted at the junction of dissimilar metals or other conductors upon application of an electric current. For the most part, a large number of junctions is required for a pronounced thermal effect and, consequently, the Peltier junctions form a pile or battery to which a source of electrical energy may be connected. The Peltier conductors and their junctions may lie in parallel or in series-parallel configurations and may have substantially any shape. For example, a Peltier battery or pile may be elongated or may form a planar or three-dimensional (cubic or cylindrical) array. When the Peltier effect is used in a heat pump, the Peltier battery or pile is associated with a heat sink or heat exchange jacket to which heat transfer is promoted, the heat exchanger being provided with ribs, channels or the like to facilitate heat transfer to or from the Peltier pile over a large surface area of high thermal conductivity. A jacket of aluminum or other metal of high thermal conductivity may serve for this purpose.

It has been the practice heretofore to electrically insulate the Peltier pile or battery and the conductor and/or junctions thereof from the heat exchanger with a material of high electrical resistivity, e.g., mica layers. This, however, introduces a disadvantage in that mica layers also are of low thermal conductivity and the use of such layers reduces the high thermal efficiency which might be obtainable with direct contact between the Peltier battery or pile and the surrounding heat exchanger. Of course, one may reduce the thickness of the mica layer to a minimum, thereby increasing the thermal conductivity to a maximum while maintaining sufficient electrical insulating properties; this has not been found to be practical because, on the one hand, it is difficult to obtain mica of sufficient small thickness and, on the other hand, thin mica layers are difficult to handle and to introduce between Peltier battery or pile and the surrounding heat exchanger. The mechanical properties of mica, therefore, have created some of the difficulties hitherto encountered with heat pumps using the Peltier effect. In general, electrically insulating materials of the types hitherto proposed for interposition between Peltier battery or pile and the electrically and thermally conductive heat exchanger or jacket have also been characterized by low thermal conductivity and poor heat transfer efficiency.

The layers, when used in sufficient thickness to provide electrical insulation, have given rise to temporary differentials between the heat exchanger and the Peltier battery or pile which are well above 10° C. Even attempts to overcome this disadvantage by the use of thermally conductive pastes have proved insufficient.

It is, therefore, the principal object of the present invention to provide an improved Peltier-effect heat pump whereby the aforementioned disadvantages can be obviated.

It is another object of this invention to provide a Peltier pile or battery, in combination with a heat exchanger, which manifests improved thermal transfer between these members.

It is yet another object of my invention to reduce the thermal resistance between the heat exchanger and the Peltier-effect battery or pile while nevertheless affording a high level of electrical insulation.

These objects and others which will become apparent hereinafter are attained, in accordance with the present invention in a Peltier-effect device which comprises a Peltier pile having a plurality of dissimilar material defining the usual Peltier couples and bridged by high-conductivity metal, e.g., copper. According to the principles of the present invention, the Peltier pile is surrounded or flanked by a heat exchanger which may be metallic and, therefore, of high electrical and thermal conductivity, the electrical insulation between the copper bridges and the heat exchanger being provided by at least one and preferably a plurality of semiconductive layers which define one or more barrier layers maintained at an electrical bias designed to prevent, in the manner of a rectification effect, electrical current flow between the heat exchanger and the copper bridges of the pile.

According to a feature of this invention, a plurality of superimposed semiconductive layers, e.g., materials of different lattice configurations, materials of similar lattice configurations or materials of identical lattice configurations doped with different amounts of the same or different substances, are provided between the Peltier pile and the heat exchanger and in intimate contact with the copper bridges and with the conductive heat exchanger.

The use of one or more semiconductive layers upon one or both of the confronting metallic surfaces forms the barrier layers which also can be produced within the body of the semiconductor layer by diffusion or the like. Since the bias at the barrier layer prevents electrical conductivity thereacross, the semiconductive layers function as metallic heat conductors and as almost perfect electrical insulators.

The semiconductive layers may be formed upon the surface of the heat exchanger confronting the Peltier pile, on the copper bridges of the Peltier pile, or upon both by conventional techniques, e.g., vapor deposition and need only have a thickness which is sufficient to assure the formation of the barrier layer. Thicknesses of the order of 1 to 50 microns have been found to be effective for this purpose. The semiconductors may be of the doped type using primarily elements of group IV of the periodic table, e.g., silicon and germanium, or may be binary semiconductors made up, for example, of indium-antimony solid solutions. The bias applied at the barrier layer (potential barrier to conduction) may be exclusively that inherent in the barrier layer and may be augmented by the application of a reverse bias to heighten the potential barrier.

The above and other objects, features and advantages of the present invention will become more readily apparent from the following description, reference being made to the accompanying drawing in which:

The sole FIGURE is a cross section through a heat pump operating in accordance with the Peltier effect and embodying principles of the present invention.

In the drawing, I show a Peltier battery or pile consisting of dissimilar conductors represented at N and P, connected in cascade by highly conductive copper bridges 6, terminal strips of copper being provided at 6' and 6'' to form the end conductors of the pile. The pile, represented generally at 10, is surrounded by a heat exchanger 1 having a central body **1*a* formed with inner surfaces 2 confronting the copper bridges and with outwardly extending fins 1*b* promoting heat exchange with a surrounding fluid. In the embodiment illustrated in the drawing, a barrier layer 3, represented in broken lines, is formed by disposing a semiconductive layer 3*a* upon the inner surface 2 of the heat exchanger and causing diffusion of a portion of the semiconductor into the metal of the heat exchanger 1 (e.g., aluminum) and/or into the copper bridges 6. Two such barrier layers may be provided as shown at 4 and 5 in the drawing by superimposing a pair of semiconductive layers 4*a* and 5*a* on the copper bridges and permitting a diffusion zone 45 to form between them. The semiconductive layers have a thickness of, say, 10 microns and are formed by vacuum deposition of germanium and silicon. The drawing also shows that an electrical network 11 may be provided to connect the heat exchanger to the potential of the terminal 6''. In this case, only the natural potential barrier at the barrier layer 3, 4 or 5 prevents electrical conduction across the semiconductors 3*a*, 4*a*, 5*a* between the copper bridges 6 and the heat exchanger 1. When desired, an external source may be connected between the barrier layer 3*b* and the network 11 as shown at 12** to heighten the potential barrier and increase the insulating effect.

It has been found that, when terminals are provided at 6' and 6'' to extend outwardly of the heat exchanger, it is advantageous to provide a plurality of superimposed semiconductive layers as illustrated at the external surfaces. Such layers are shown at 4a' and 4''. It will be apparent that the electrical insulation effect is achieved with the semiconductive layers as described to a highly efficient degree without interfering with thermal conductivity which proceeds through the semiconductive layers as if they were metallic.

I claim:

1. A Peltier device comprising a Peltier pile including a plurality of Peltier conductors and copper bridges interconnecting same; an electrically and thermally conductive heat exchanger around said pile, said copper bridges and said heat exchanger having confronting surfaces; and at least one semiconductor layer between said surfaces of said pile and said heat exchanger forming a barrier layer defining a potential barrier precluding substantial electrical conduction at permitting thermal conduction between said pile and said heat exchanger.

2. The device defined in claim 1 wherein a plurality of semiconductive layers are disposed one above another to form a plurality of barrier layers between said pile and said heat exchanger.

3. The device defined in claim 1, further comprising means for electrically biasing said semiconductor layer to increase said potential barrier.

4. The device defined in claim 1 wherein said semiconductor layer is disposed upon said surface of said heat exchanger.

5. The device defined in claim 1 wherein said semiconductor layer is disposed upon said surface of said copper bridges.

6. The device defined in claim 1 wherein said heating exchanger is provided with fins extending away from said pile.

* * * * *